Jan. 11, 1949.　　　S. DUKE　　　2,459,066
VEHICLE FOR INVALIDS
Filed Sept. 7, 1945　　　2 Sheets-Sheet 1

Inventor:
Sam Duke
By H. J. Sanders
Atty.

Jan. 11, 1949.　　　　S. DUKE　　　　2,459,066
VEHICLE FOR INVALIDS
Filed Sept. 7, 1945　　　　　　　　　2 Sheets-Sheet 2
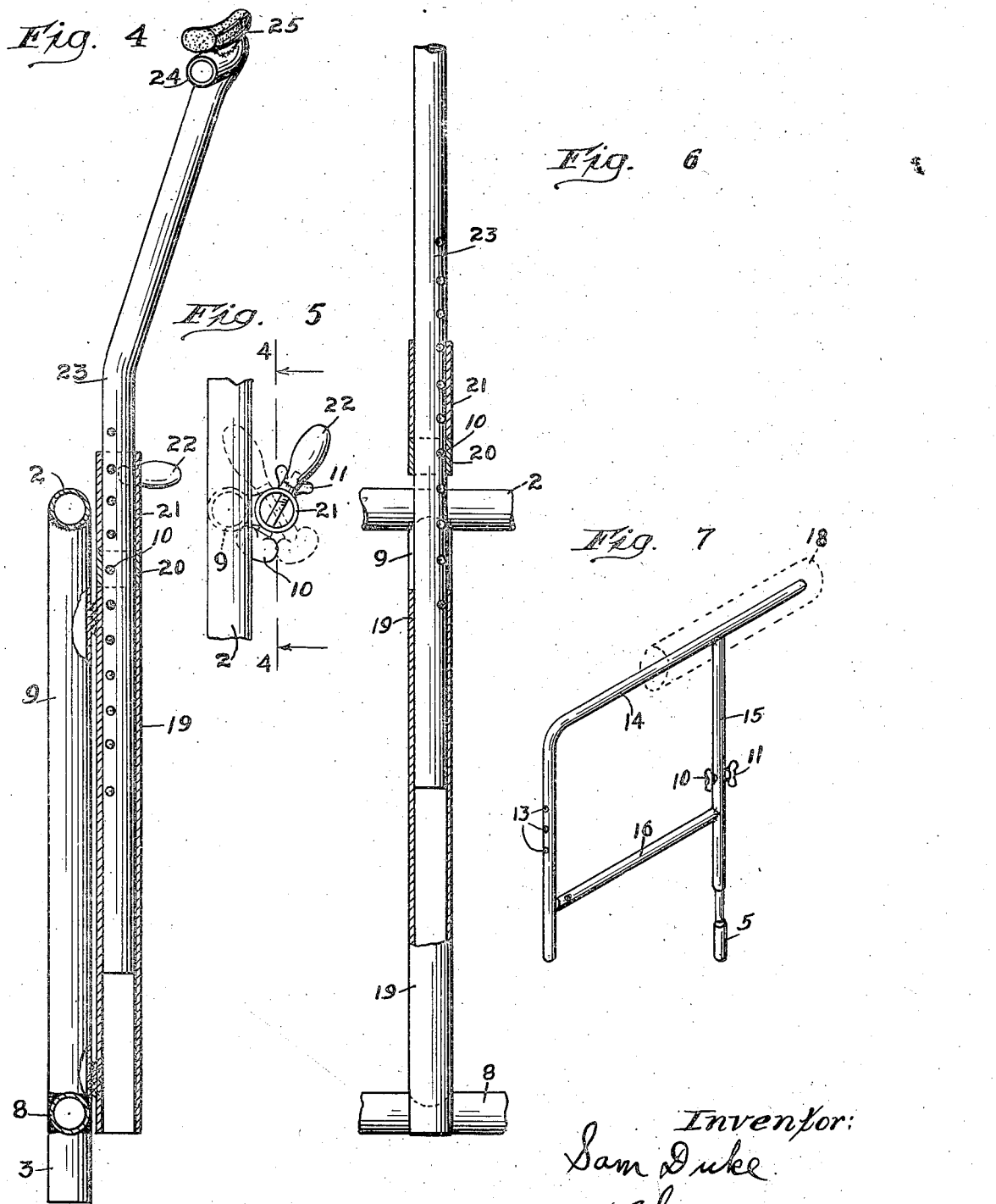

Patented Jan. 11, 1949

2,459,066

UNITED STATES PATENT OFFICE 2,459,066

VEHICLE FOR INVALIDS

Sam Duke, Chicago, Ill.

Application September 7, 1945, Serial No. 614,965

4 Claims. (Cl. 155—22)

This invention relates generally to improvements in vehicles for invalids of that type permitting the invalid to move about from place to place while standing or sitting without placing weight or strain on the limbs. An important feature is to provide an invalid walker that in operation imparts little or no jar or vibration to the occupant, that is very easily operated and so responsive to the operator that it may be guided from place to place and maneuvered generally with but slight effort.

A further object is to provide a vehicle for invalids and convalescents that is devoid of vibration and play in use. Still another object is to provide a vehicle for invalids and convalescents that is of light weight but sturdy construction, inexpensive to manufacture, composed of few parts all of which are readily accessible for repair or adjustment, and that is durable and efficient in use.

With the foregoing and other objects in view the invention consists in the combination and arrangement of parts to be hereinafter fully described, pointed out in the claims and illustrated in the accompanying drawings that form a part of this patent, and in which—

Fig. 4 is a detail view, partly in section, of one crutch attachment member and its connection to the frame of the vehicle, taken on the line 4—4 of Fig. 5.

Fig. 5 is a plan view of Fig. 4.

Fig. 6 is a view of Fig. 4 with parts in an altered position, and,

Fig. 7 is a view of the seat frame, the seat being shown in dotted lines.

Like reference characters denote corresponding parts throughout the several views.

Figure 1:
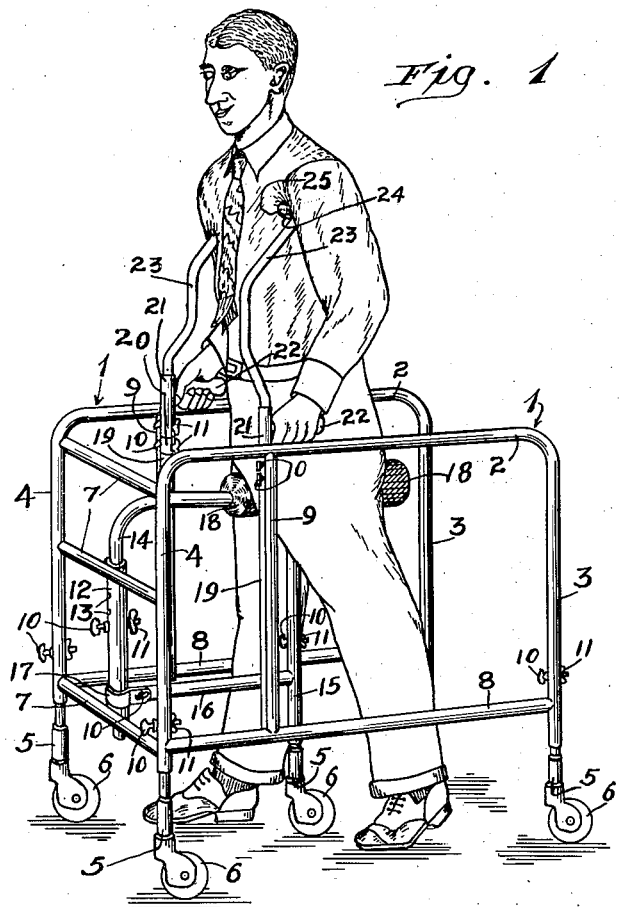
Fig. 1 is a view of the improved structure in perspective, illustrating its use.
Figure 3:
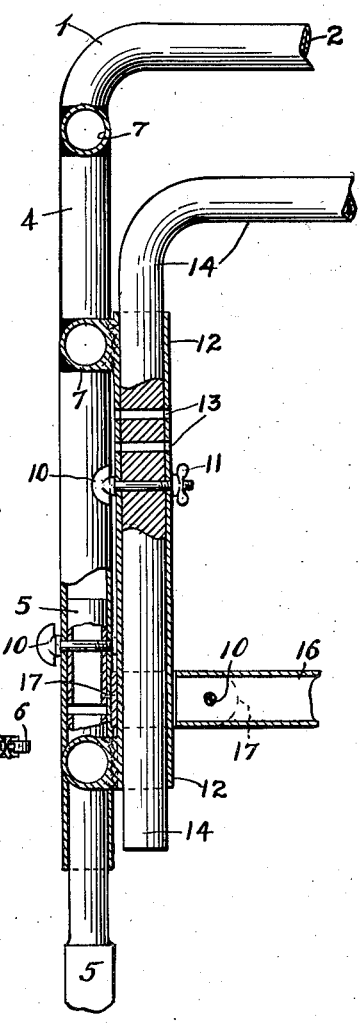
Fig. 3 is an enlarged fragmentary view, partly in section, taken on the line 3—3 of Fig. 2.
Figure 2:
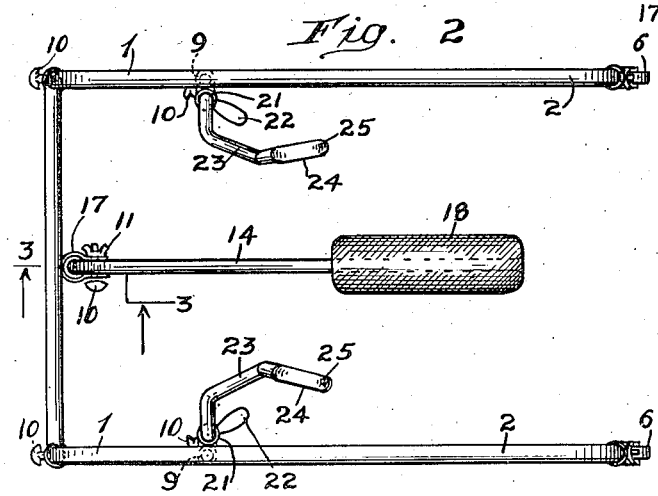
Fig. 2 is a top plan view of the structure shown in Fig. 1.

This vehicle structure includes a frame formed preferably of tubing or tubing and rods arranged telescopically to afford ready adjustment when desired. The frame consists of two twin parallel side members 1, each including a horizontal top rail 2, vertical end rails 3, 4 receiving in their lower ends the shanks 5 of casters 6.

The vertical rails 4 are connected by braces 7 thus forming the front and closed end of the frame, the opposite or rear end being open to provide entrance and exit means; said end rails being connected by a longitudinally extending brace 8 and each top rail 2 and brace 8 being connected by a vertical brace 9. The shank 5 of each caster is formed in its upper portion with a plurality of perforations adapted for alignment with a similar perforation in said rail to receive the screwbolt 10 provided with a nut 11 for retaining the frame in adjusted position above the ground line.

Welded or otherwise suitably secured to the two lower braces 7 between said side members is the sleeve 12 formed with a plurality of perforations 13 and adjustably receiving one end of the angular seat bar 14 formed with corresponding perforations which when aligned with perforations 13 receive a screwbolt 10 to retain said seat bar in position, said seat bar at its outer end being provided with the soft cushioned saddle 18. Secured to and depending from said seat bar 14 is the seat post 15 connected by the brace 16 and fitting 17 to sleeve 12, said seat post at its lower end being supported by the caster 6.

Welded or otherwise secured to each vertical brace 9 is a tube 19 freely received upon the upper end of which is the collar 20 upon which is similarly disposed the sleeve 21 to which is secured the hand grip 22, said collar and sleeve being adjustably connected to perforated portions of the crutch 23 received in said sleeve collar and tube and secured by screwbolts 10 and nuts 11.

Obviously said crutches are capable of vertical adjustment and when satisfactorily adjusted may be securely maintained in the desired position by bolts and nuts 10, 11, said crutches being so angled or shaped that their topmost substantially horizontal ends 24 provided with armpit rests 25 of cushioned material are positioned to comfortably accommodate the user and sustain a material portion of his weight when he straddles the saddle, as clearly shown in Fig. 1.

In use the seat or saddle 18 is so adjusted as to comfortably receive the user while permitting his feet to engage the floor to propel the vehicle which may readily be moved forward, backward, laterally, at any angle, or pivotally if desired to turn around or make a short turn. The hand grips may serve as rests and to assist in guiding the vehicle. The weight of the user upon the seat while received directly upon the caster at the end of the seat post also greatly steadies the vehicle due to the brace 16 and fitting 17 engaging the stout tube 19 welded to braces 7. When stationary the user may place his feet upon the lower brace 7 as a foot rest if desired. The vehicle is very safe and comfortable in use due to its light weight, great strength and low center of gravity. The crutches are disposed somewhat in advance of the seat which, however, is supported at points both in advance and in rear of the crutches, the crutch-direct supports are wholly within the frame upon opposite sides thereof and at points wholly below the top bar, this specific arrangement providing an efficient compensating weight distribution which is highly desirable in vehicles of this nature.

While I have illustrated certain details of construction and a certain definite arrangement of parts which in practice have been found very desirable, I do not wish to be limited to these details except as defined in the appended claims.

What is claimed is:

1. In a vehicle for invalids, a frame including side members, braces connecting said side members, crutches carried by said side members, a seat, a seat post supporting said seat at one side of said crutches, and a seat bar for said seat extending therefrom to the opposite side of said crutches and supported by said braces.

2. In a vehicle for invalids and convalescents, a wheeled frame including side members, braces connecting said side members, crutches carried by said side members, a tube carried by said braces, a seat, a wheeled seat post supporting said seat at the opposite side of said crutches with respect to said tube, and a seat bar for said seat adjustably supported in said tube.

3. In a vehicle for invalids, a wheeled frame including side members, braces connecting said side members, crutches carried by said side members, a tube carried by said braces forwardly of said crutches, a seat rearwardly of said crutches, a seat bar carried by said tube carrying said seat, a wheeled seat post supporting one end of said seat bar and said seat, and a brace connecting said seat post and seat tube.

4. In a vehicle for invalids, a wheeled frame including side members, braces connecting said side members, tubes carried by said side members forwardly thereof, collars upon said tubes, sleeves upon said collars, crutches adjustably received in said tubes, collars and sleeves, means for locking said crutches in adjusted positions connecting same and said collars, hand grips carried by said sleeves, and a seat carried by said frame.

SAM DUKE.

REFERENCES CITED

The following references are of record in the file of this patent:

UNITED STATES PATENTS

| Number | Name | Date |
|---|---|---|
| 1,307,058 | McGrath | June 17, 1919 |
| 1,949,163 | Kasten et al. | Feb. 27, 1934 |
| 2,077,569 | Kish | Apr. 20, 1937 |
| 2,278,901 | Smock | Apr. 7, 1942 |

FOREIGN PATENTS

| Number | Country | Date |
|---|---|---|
| 828,115 | France | Feb. 7, 1938 |